US012674565B1

(12) United States Patent
Shu

(10) Patent No.: US 12,674,565 B1
(45) Date of Patent: Jul. 7, 2026

(54) FOLDABLE WIDE-ANGLE HEADLAMP

(71) Applicant: Congchao Shu, Xiangxiang City (CN)

(72) Inventor: Congchao Shu, Xiangxiang City (CN)

( * ) Notice: Subject to any disclaimer, the term of this patent is extended or adjusted under 35 U.S.C. 154(b) by 0 days.

(21) Appl. No.: 19/283,417

(22) Filed: Jul. 29, 2025

(51) Int. Cl.
*F21V 21/084* (2006.01)
*F21L 4/02* (2006.01)
*A42B 3/04* (2006.01)

(52) U.S. Cl.
CPC ............ *F21V 21/084* (2013.01); *F21L 4/025* (2013.01); *A42B 3/044* (2013.01); *A42B 3/0446* (2013.01)

(58) Field of Classification Search
CPC ..... A42B 3/044; A42B 3/0446; F21V 21/084; F21L 4/025
See application file for complete search history.

(56) References Cited

U.S. PATENT DOCUMENTS

| | | | | |
|---|---|---|---|---|
| 9,068,707 | B1 * | 6/2015 | Boxler | F21S 8/00 |
| 10,907,776 | B1 * | 2/2021 | Haddad | F21S 4/22 |
| 11,384,913 | B2 * | 7/2022 | Bertken | F21L 4/02 |
| 12,117,146 | B2 * | 10/2024 | Bellis | F21L 4/02 |
| 2020/0248896 | A1 * | 8/2020 | Gall | F21V 21/0816 |
| 2021/0033266 | A1 * | 2/2021 | Cheng | F21V 23/0414 |
| 2025/0344305 | A1 * | 11/2025 | Shu | F21V 23/0414 |

* cited by examiner

*Primary Examiner* — Tracie Y Green
*Assistant Examiner* — Michael Chiang
(74) *Attorney, Agent, or Firm* — Nicholas Makridakis

(57) ABSTRACT

A foldable wide-angle headlamp is provided, including a supporting case, a flexible case, a circuit board, and a flexible light strip. The flexible case comprises a wrapping body and a wrapping tape those are integrally formed, the wrapping body is configured to wrap up the supporting case, the wrapping tape is in a shape of a long strip, and the wrapping tape is configured to be folded and unfolded relative to the wrapping body. The circuit board is arranged within the supporting case, and the circuit board is provided with lighting beads exposed on a front outer surface of the wrapping body. The flexible light strip is covered by the wrapping tape. By setting the lighting beads on the circuit board and using the flexible light strip wrapped by the wrapping tape, making the product of the present disclosure foldable and compact in size.

9 Claims, 5 Drawing Sheets

FOLDABLE WIDE-ANGLE HEADLAMP

TECHNICAL FIELD

The present disclosure relates to the technical field of lamps, and in particular to a foldable wide-angle headlamp.

BACKGROUND

Headlamp is a portable lighting device designed to be worn on the head to provide illumination when performing other tasks with both hands. This type of lighting fixture typically consists of a lightweight lamp body, a headband or a helmet mount, and one or more light sources (such as LED beads). The headlamp is designed to be lightweight, comfortable to wear, and will not bring too much burden to the user. The headband or the helmet mount may be adjusted according to individual head circumference to ensure stable wearing.

Currently, traditional headlamps have limited illumination angles (usually ≤120°) and require frequent head rotation to adjust the field of view. In existing technologies, although some headlamps attempt to achieve wide-angle illumination through multiple light beads combinations, there are problems such as bulky structure and high energy consumption. In addition, the current headlamps generally have the following technical defects: for example, single functionality, only supporting basic brightness adjustment, unable to meet the needs of multiple scenarios such as outdoor exploration and night work; the operation is cumbersome, the button logic is complex, and it is difficult to quickly control when wearing gloves; insufficient waterproof performance, unable to cope with harsh weather conditions; short battery life, requiring frequent charging or battery replacement. Therefore, there is an urgent need for a headlamp solution that balances wide-angle illumination, multifunctional integration, and portability.

SUMMARY

In view of shortcomings of the above existing technologies, the present disclosure aims to provide a foldable wide-angle headlamp that can effectively solve the problems of limited illumination angles, bulky structure, and signal functionality of existing headlamps.

To achieve the above objectives, the present disclosure adopts the following technical solutions.

In some embodiments of the present disclosure, a foldable wide-angle headlamp is provided, including a supporting case, a flexible case, a circuit board, and a flexible light strip. Herein the flexible case includes a wrapping body and a wrapping tape those are integrally formed, the wrapping body is configured to wrap up the supporting case, the wrapping tape is in a shape of a long strip, and the wrapping tape is configured to be folded and unfolded relative to the wrapping body. The circuit board is arranged within the supporting case, and the circuit board is provided with lighting beads exposed on a front outer surface of the wrapping body. The flexible light strip is covered by the wrapping tape and is electrically connected with the circuit board, the flexible light strip is provided with a light-emitting portion, the light-emitting portion is in a form of a long strip and is configured to extend along a length direction of the wrapping tape, exposing on a front outer surface of the wrapping tape.

In some preferred embodiments of the present disclosure, the supporting case includes a front cover and a back cover, the front cover and the back cover are joined together front and back to form a receiving cavity, the circuit board is arranged in the receiving cavity, and one end of the flexible light strip is clamped by the front cover and the back cover for fixation.

In some preferred embodiments of the present disclosure, the front cover and the back cover are made of hard plastic material.

In some preferred embodiments of the present disclosure, the front cover is provided with a first through-hole that is connected to the receiving cavity, the wrapping body is provided with a second through-hole that is directly aligned and connected to the first through-hole, and the lighting beads are configured to pass through the first through-hole and the second through-hole in sequence to expose on the front outer surface of the wrapping body.

In some preferred embodiments of the present disclosure, the receiving cavity is provided with a rechargeable battery that is electrically connected with the circuit board, the circuit board is provided with a charging interface that is exposed on an outer surface of the supporting case, and the wrapping body is provided with a sealing plug for sealing the charging interface.

In some preferred embodiments of the present disclosure, the rechargeable battery is a lithium battery having 1500 mAh, and the charging interface is a Type-C interface.

In some preferred embodiments of the present disclosure, the circuit board is provided with multiple control switches, the wrapping body is provided with multiple keycaps, and the multiple keycaps are configured to cover the multiple switches, respectively.

In some preferred embodiments of the present disclosure, the lighting beads are XPE side light beads.

In some preferred embodiments of the present disclosure, the flexible light strip is a COB light strip with 3535 specification, and the light-emitting portion is provided with an arc-shaped reflector.

In some preferred embodiments of the present disclosure, the lighting beads consist of two arranged on left and right sides.

The foldable wide-angle headlamp of the present disclosure has significant advantages and beneficial effects compared to the existing technologies. Specifically, the following advantages can be seen from the above technical solutions.

By setting the lighting beads on the circuit board and using the flexible light strip wrapped by the wrapping tape, making the product of the present disclosure foldable and compact in size. At the same time, the combination of the lighting beads and the flexible light strip can achieve 230° wide-angle illumination, illuminating the entire field of view without rotating the head. Moreover, the flexible case can achieve better waterproof performance, meeting the needs of use and bringing convenience to use.

Figure 1:
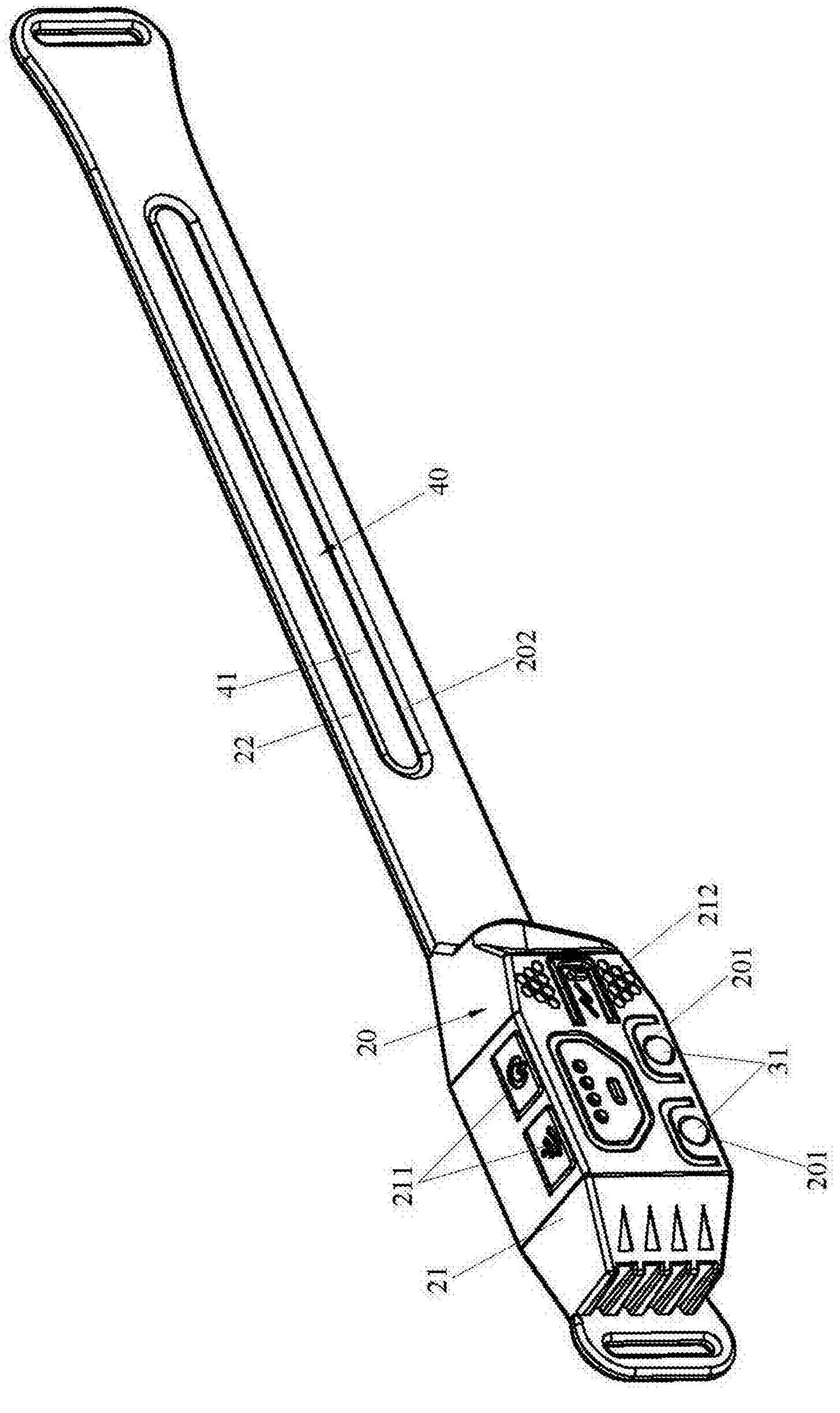
FIG. 1 shows an assembled three-dimensional schematic diagram of a foldable wide-angle headlamp in accordance with some preferred embodiments of the present disclosure.

In the drawings, reference numerals are as follows.

10 Supporting case 11 Front cover
12 Back cover 101 Receiving cavity
102 First through-hole 20 Flexible case
21 Wrapping body 211 keycap
212 Sealing plug 22 Wrapping tape
201 Second through-hole 202 Long slotted hole
30 Circuit board 31 Lighting bead
32 Control switch 33 Charging interface
40 Flexible light strip 41 Light-emitting portion
50 Rechargeable battery 60 3M single sides adhesive cotton

DETAILED DESCRIPTION OF THE EMBODIMENTS

Figure 2:
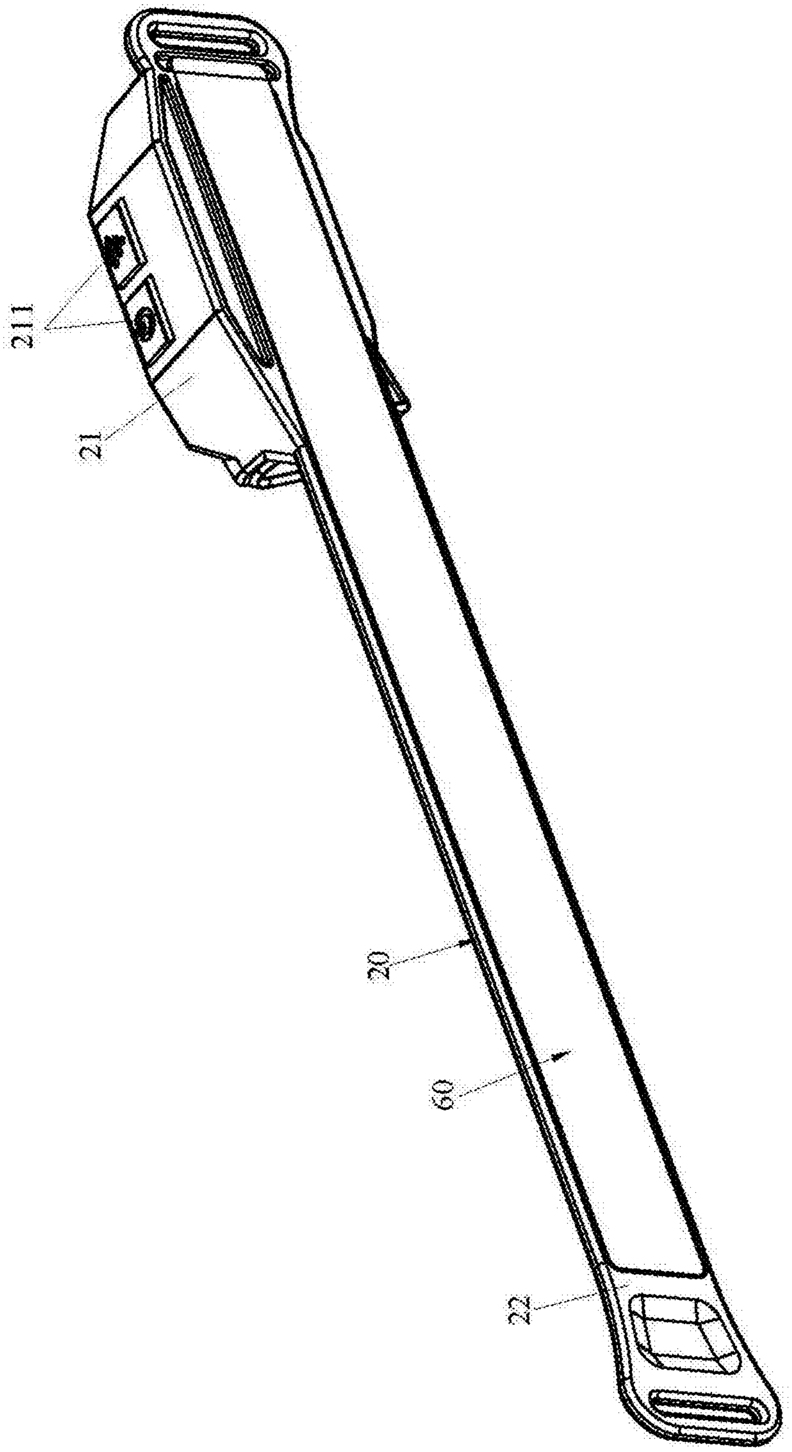
FIG. 2 shows another assembled three-dimensional schematic diagram of the foldable wide-angle headlamp in accordance with some preferred embodiments of the present disclosure.
Figure 3:
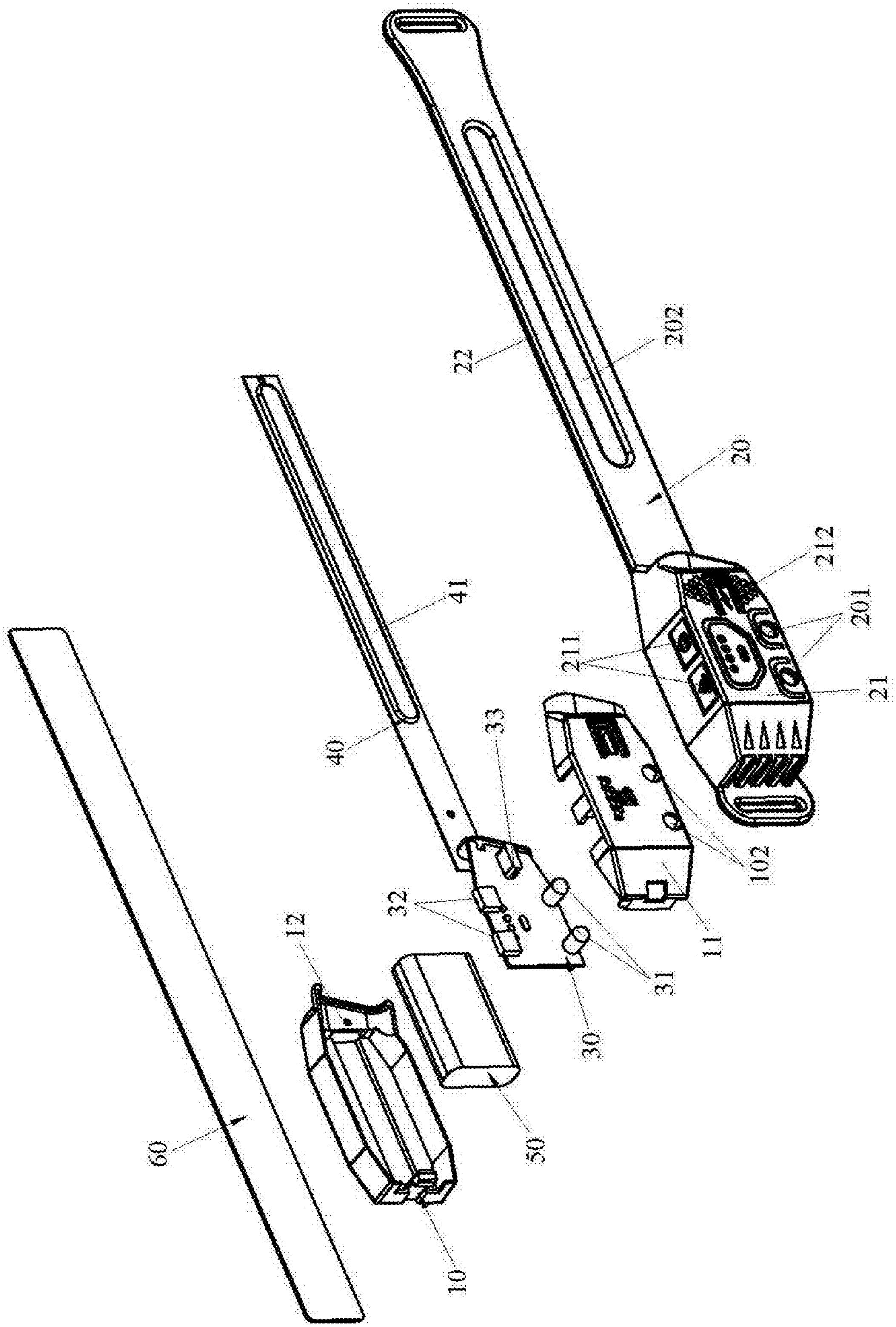
FIG. 3 shows an exploded view of the foldable wide-angle headlamp in accordance with some preferred embodiments of the present disclosure.
Figure 4:
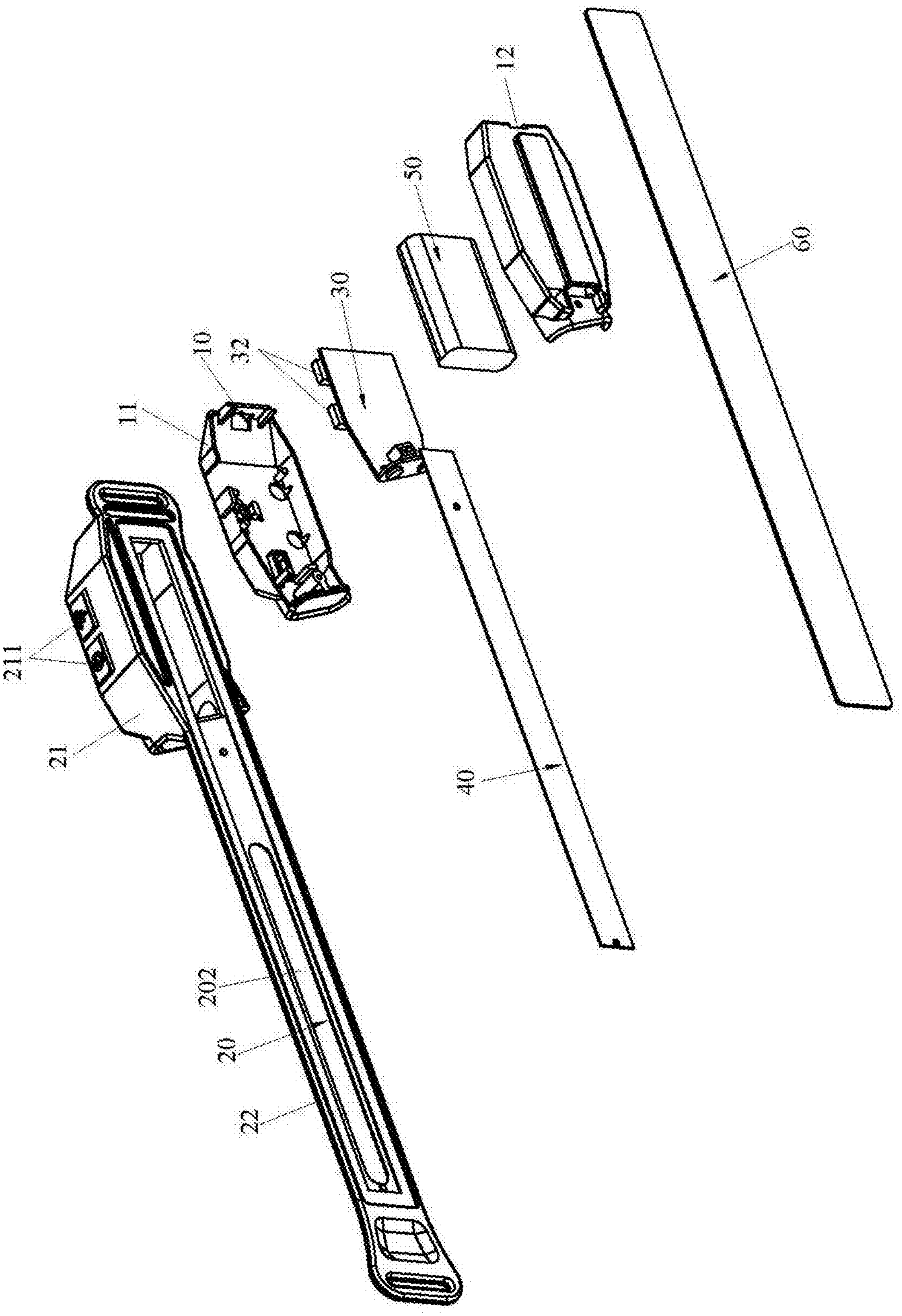
FIG. 4 shows another exploded view of the foldable wide-angle headlamp in accordance with some preferred embodiments of the present disclosure.
Figure 5:
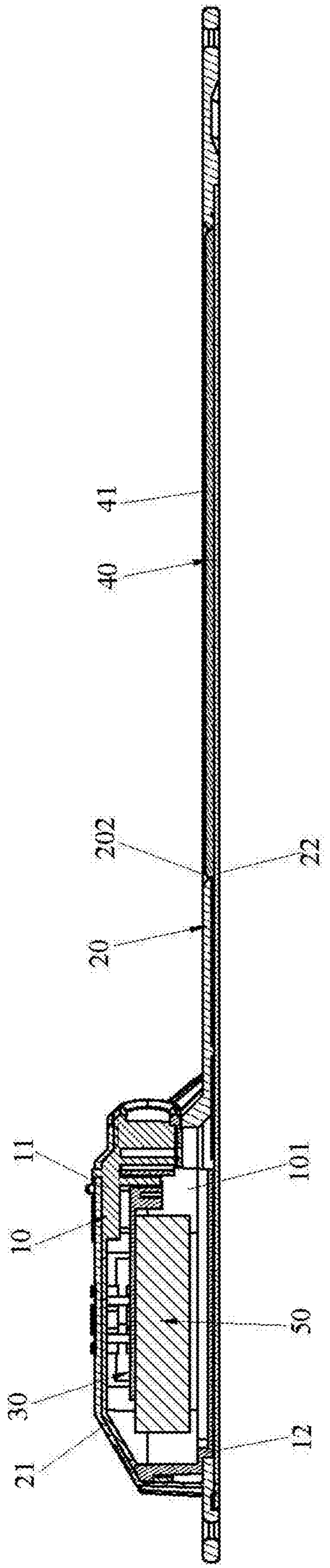
FIG. 5 shows a sectional view of the foldable wide-angle headlamp in accordance with some preferred embodiments of the present disclosure.

Referring to FIG. 1 to FIG. 5, in some preferred embodiments of the present disclosure, a foldable wide-angle headlamp is provided, including a supporting case 10, a flexible case 20, a circuit board 30, and a flexible light strip 40.

The supporting case 10 includes a front cover 11 and a back cover 12. The front cover 11 and the back cover 12 are joined together to form a receiving cavity 101, both the front cover 11 and the back cover 12 are made of hard plastic material. The front cover 11 is provided with a first through-hole 102, which is connected to the receiving cavity 101, and the first through-hole 102 consists of two spaced apart holes on the left and right sides. And, the receiving cavity 101 is provided with a rechargeable battery 50, which is a lithium battery having 1500 mAh and can last for 10 hours.

The flexible case 20 includes a wrapping body 21 and a wrapping tape 22 those are integrally formed, the wrapping body 21 is configured to wrap up the supporting case 10, the wrapping tape 22 is in a shape of a long strip, and the wrapping tape 22 is configured to be folded and unfolded relative to the wrapping body 21. In some embodiments of the present disclosure, the flexible case 20 is made of silicone or rubber material, not limited to this. The wrapping body 21 is provided with a second through-hole 201, which is directly aligned and connected to the first through-hole 102. The second through-hole 201 consists of two spaced apart holes on the left and right sides, and two second through-holes 201 are respectively directly connected to two first through-holes 102. The wrapping tape 22 is provided with a long slotted hole 202. Moreover, the wrapping body 21 is provided with multiple keycaps 211, and the wrapping body 21 is further provided with a sealing plug 212.

The circuit board 30 is arranged within the supporting case 10, and the circuit board 30 is provided with lighting beads 31, which are exposed on the front outer surface of the wrapping body 21. In some embodiments of the present disclosure, the circuit board 30 is disposed in the receiving cavity 101, and the lighting beads 31 are configured to pass through the first through-hole 102 and the second through-hole 201 in sequence to expose on the front outer surface of the wrapping body 21. The lighting beads 31 are XPE side light beads, which achieve local strong light focusing through a condenser lens (focal length 15 mm). The light beads 31 consist of two arranged on left and right sides, and the two light beads 31 sequentially pass through the corresponding first through-hole 102 and the corresponding second through-hole 201, exposing on the front outer surface of the wrapping body 21. In addition, the circuit board 30 is provided with multiple control switches 32, which are covered by the keycaps 211 respectively. Moreover, the rechargeable battery 50 is electrically connected with the circuit board 30, the circuit board 30 is provided with a charging interface 33 exposed on the outer surface of the supporting case 10. The charging interface 33 is sealed by the sealing plug 212 and the charging interface 33 is a Type-C interface. Furthermore, the circuit board 30 is configured to integrate an infrared sensor that supports waving to turn on and off, solving the problem of glove wearing operation. It uses a HC-SR501 infrared pyroelectric sensor with a detection angle of 120°, a response distance of 0.5-5 meters, and it supports fast sensing in 0.5 seconds. When waving is triggered, the MCU (model: STM32F103C8T6) receives the sensor signal, controls the MOS tube to turn on and off the lights, and switches the on and off state with a single waving.

The flexible light strip 40 is wrapped by the wrapping tape 22, and is electrically connected with the circuit board 30. The flexible light strip 40 is provided with a light-emitting portion 41, which is in a form of a long strip and is configured to extend along a length direction of the wrapping tape 22, and the lighting-emitting portion 41 is exposed on the front outer surface of the wrapping tape 22. In some embodiments of the present disclosure, the light-emitting portion 41 is located in the long slotted hole 202, and one end of the flexible light strip 40 is clamped by the front cover 11 and the back cover 12 for fixation. In addition, the flexible light strip 40 is made of a COB light strip with 3535 specification, with a length of 12 cm and a light emission angle of 160°. The light-emitting portion 41 is provided with an arc-shaped reflector, with a curvature radius of 50 mm, which spreads the light to a wide angle range of 230°.

Furthermore, the surface of the flexible case 20 is fixed with 3M single-sided adhesive cotton 60, making it easy to fix with the user's head for installation.

The testing standards of for the product of the present disclosure are as follows.

Lighting angle: tested in a dark room at a distance of 3 meters from the wall, the coverage width of the light spot in COB mode is ≥5.8 meters (corresponding to a 230° angle).

Sensitivity: wave user's hand within a distance of 0.5-3 meters, and the sensor response time is ≤0.3 seconds.

Waterproof test: spray the headlamp from any direction with a water flow of 10 L/min for minutes, and the result shows no signs of water ingress inside of the headlamp.

Battery life test: in the low-brightness mode of COB, the headlamp can operate continuously for 10 hours, with a voltage of ≥3.4 V (battery nominal voltage 3.7V).

The product of the present disclosure integrates the COB strip light source and motion sensing technology to solve the problems of limited lighting range and cumbersome operation of traditional headlamps. It has significant practicality in outdoor exploration, night work, emergency rescue and other scenarios. After testing, the headlamp of the present disclosure works normally in an environment of −10° C. to 40° C., with a range of 8 hours of continuous outdoor use. Its waterproof performance can cope with moderate rain weather, providing users with an efficient, convenient, and safe lighting experience.

The design focus of the foldable wide-angle headlamp of the present disclosure lies in, by setting the lighting beads on the circuit board and using the flexible light strip wrapped by the wrapping tape, making the product of the present disclosure foldable and compact in size. At the same time, the combination of the lighting beads and the flexible light strip can achieve 230° wide-angle illumination, illuminating the entire field of view without rotating the head. Moreover, the flexible case can achieve better waterproof performance, meeting the needs of use and bringing convenience to use.

The technical principles of the present disclosure have been described above in conjunction with specific embodiments. These descriptions are only intended to explain the principles of the present disclosure and cannot be interpreted in any way as limiting the scope of protection of the present disclosure. Based on the explanations herein, one of ordinary skill in the art may associate to other specific embodiments without creative labor, which shall all fall within the scope of protection of the present invention.

What is claimed is:

1. A foldable wide-angle headlamp, comprising a supporting case, a flexible case, a circuit board, and a flexible light strip;

wherein the flexible case comprises a wrapping body and a wrapping tape that are integrally formed, the wrapping body is configured to wrap up the supporting case, the wrapping tape is in a shape of a long strip, and the wrapping tape is configured to be folded and unfolded relative to the wrapping body;

wherein the circuit board is arranged within the supporting case, and the circuit board is provided with lighting beads exposed on a front outer surface of the wrapping body;

wherein the flexible light strip is a COB light strip with 3535 specification, and the light-emitting portion is provided with an arc-shaped reflector; and wherein the flexible light strip is covered by the wrapping tape and is electrically connected with the circuit board, the flexible light strip is provided with a light-emitting portion, the light-emitting portion is in a form of a long strip and is configured to extend along a length direction of the wrapping tape, exposing on a front outer surface of the wrapping tape.

2. The foldable wide-angle headlamp according to claim 1, wherein the supporting case comprises a front cover and a back cover, the front cover and the back cover are joined together to form a receiving cavity, the circuit board is arranged in the receiving cavity, and one end of the flexible light strip is clamped by the front cover and the back cover for fixation.

3. The foldable wide-angle headlamp according to claim 2, wherein the front cover and the back cover are made of hard plastic material.

4. The foldable wide-angle headlamp according to claim 2, wherein the front cover is provided with a first through-hole that is connected to the receiving cavity, the wrapping body is provided with a second through-hole that is directly aligned and connected to the first through-hole, and the lighting beads are configured to pass through the first through-hole and the second through-hole in sequence to expose on the front outer surface of the wrapping body.

5. The foldable wide-angle headlamp according to claim 2, wherein the receiving cavity is provided with a rechargeable battery that is electrically connected with the circuit board, the circuit board is provided with a charging interface that is exposed on an outer surface of the supporting case, and the wrapping body is provided with a sealing plug for sealing the charging interface.

6. The foldable wide-angle headlamp according to claim 5, wherein the rechargeable battery is a lithium battery having 1500 mAh, and the charging interface is a Type-C interface.

7. The foldable wide-angle headlamp according to claim 1, wherein the circuit board is provided with multiple control switches, the wrapping body is provided with multiple keycaps, and the multiple keycaps are configured to cover the multiple switches, respectively.

8. The foldable wide-angle headlamp according to claim 1, wherein the lighting beads are XPE side light beads.

9. The foldable wide-angle headlamp according to claim 1, wherein the lighting beads consist of two lighting beads arranged on left and right sides.

* * * * *